Patented May 14, 1940

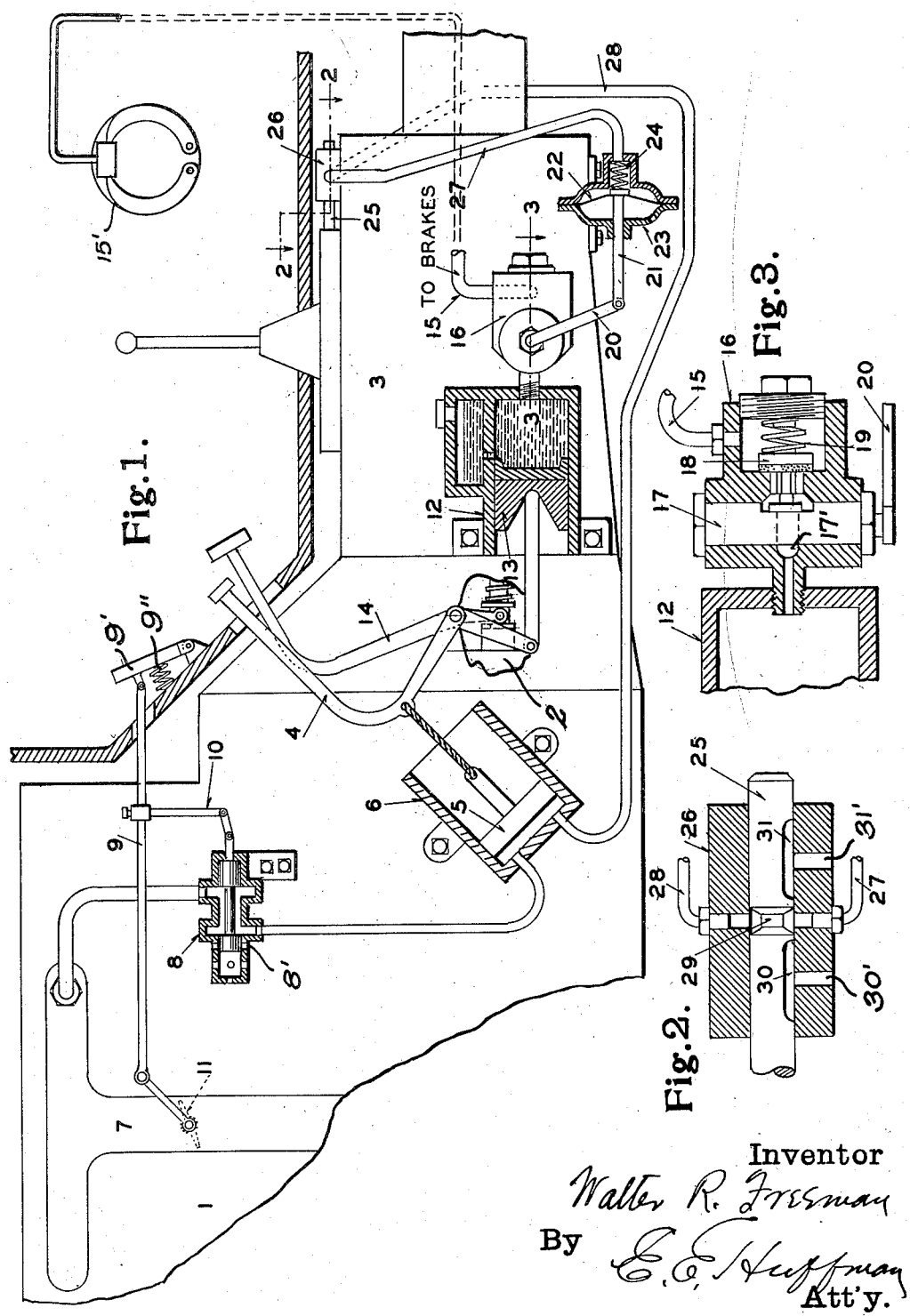

2,201,125

UNITED STATES PATENT OFFICE 2,201,125

CLUTCH AND BRAKE MECHANISM

Walter R. Freeman, University City, Mo., assignor to Wagner Electric Corporation, St. Louis, Mo., a corporation of Delaware Application November 9, 1932, Serial No. 641,831

23 Claims. (Cl. 192—.01)

My invention relates to the control of the brake mechanism of a motor vehicle which is equipped with power means for operating the clutch mechanism.

One of the objects of my invention is to provide power operable means for holding the brakes in applied position, which means is operable in conjunction with and at the time the clutch disengaging power means functions to disengage the clutch.

Another object of my invention is to provide means for rendering said power operable brake holding means inoperative when an element of the change speed transmission mechanism of the vehicle is in a selected position and the clutch is disengaged.

Other objects of my invention will become apparent from the following description taken in connection with the accompanying drawing in which Figure 1 is a side elevation, partly in section, of a portion of a motor vehicle showing my invention in combination with the power-operated clutch mechanism, the braking mechanism, and the change speed transmission mechanism; and Figures 2 and 3 are cross sectional views on the lines 2—2 and 3—3, respectively, of Figure 1.

Referring to the drawing in detail, I indicates the engine of a motor vehicle which is connected by means of the clutch 2 and a change speed transmission 3 to the road wheels of the vehicle for supplying power thereto in a well known manner. The clutch 2 is provided with a clutch pedal 4 which is adapted to be automatically disengaged by power means when the engine throttle is brought to closed position. The operation of this automatic clutch disengaging means is well known and, therefore, need only be briefly described. The clutch pedal has connected thereto the piston 5 of the suction motor 6 which in turn is in communication with the engine manifold 7 through the valve 8. This valve is connected to the accelerator rod 9 by the adjustable linkage 10 in such manner that when the accelerator pedal 9' is in a position to close the throttle valve 11 under the action of the accelerator pedal return spring 9'', the valve 8 will be open to place the manifold in communication with the suction motor to disengage the clutch, as shown. When the accelerator pedal is depressed, the valve 8 is moved to a position to vent the suction motor to atmosphere through ports 8' and permit the clutch to re-engage.

An hydraulic brake compressor 12 is secured to the vehicle chassis, the piston 13 of which is actuated by the brake pedal 14 to force liquid under pressure through the conduit 15 to the wheel cylinders of the brakes 15' (only one being shown). The conduit 15, where it is attached to the compressor, is provided with a shut-off valve 16, commonly known as the "no roll" valve, the purpose of which is to hold the brakes in applied position by preventing the fluid from returning to the compressor when the brake pedal is released. This valve may be of any desired construction, the one disclosed being similar to that shown in my co-pending application Serial No. 597,674, filed March 9, 1932. When the operating shaft 17 is in the position shown in Figure 3, the valve 18 is seated by the spring 19, thus preventing liquid from passing from the conduit 15 to the compressor 12. The piston of the compressor, under this condition, may be actuated to force liquid into the conduit 15 by unseating the valve against the action of the spring the liquid passing the shaft 17 by means of the groove 17'. When the operating shaft 17 is rotated through a small angle, its cam surface unseats the valve and maintains it in open position, thus permitting fluid to flow freely therethrough in either direction.

In accordance with my invention I operate this "no-roll" valve by a small suction motor which is connected to the manifold through the control valve 8, whereby the "no-roll" valve may be closed only when the clutch is disengaged. I also provide means whereby when the transmission is in its highest and next to highest speed ratios, the power means for operating the "no-roll" valve will be inoperative.

The shaft 17 of the "no-roll" valve is provided with an arm 20 which is connected by means of a rod 21 with the flexible diaphragm 22 of the suction motor 23, the diaphragm being biased by a compression spring 24 to the left, whereby the shaft 17 will be normally maintained in such position as to unseat the valve 18.

The highest and next to highest speed shift rod 25 of the transmission 3, is provided with an extended portion for operating the control valve 26 which is shown as being separate from the transmission housing although it may be incorporated in the housing if desired. One side of the control valve is in communication, by means of a conduit 27, with the closed side of the motor 23, whereas the other side is in communication, by means of the conduit 28, with the suction side of the clutch operating motor 6, thus providing communication with the manifold through valve 8. The shift rod 25 is provided with an annular recess 29, permitting communication between the conduits 27 and 28 when the shift rod is in its neutral position. Elongated recesses 30 and 31 in the shift rod provide communication between the conduit 27 and the cooperating atmospheric ports 30' and 31' when the shift rod is in either its high speed or next to high speed ratio position.

In operation of my device, when the vehicle is not moving and the engine is idling, the valve 8 will be open and the clutch disengaged. If the transmission is in neutral, low speed, or reverse, the "no-roll" valve 16 will be closed since the shift rod 25 permits the suction motor 23 to also be in communication with the manifold. If the brakes are now applied or have been applied, they will be held in such applied position by the valve 16. It is thus seen that if the vehicle is on an incline, the brakes may be held applied and the vehicle prevented from "rolling" without the operator maintaining his foot upon the brake pedal, thereby permitting the operator to use his foot to operate the accelerator.

When the accelerator is depressed as, for example, in starting the vehicle in low gear, the brake will automatically be released by the valve 8 which cuts off the communication with the manifold and vents both the suction motor 6 and the suction motor 23 to atmosphere, thus permitting the clutch to engage and the spring 24 to move the arm to open the "no-roll" valve and release the brakes if applied.

When the transmission is in either its highest or next to highest speed ratio, it is undesirable to have the brakes held in applied position as, for example, in bringing the vehicle to a stop, for under such circumstances the operator may desire to slightly release his brakes, which could not be accomplished with the "no-roll" valve closed. In accordance with my invention the motor 23 is prevented from operating when the gear shift rod assumes either of such positions and the clutch is automatically disengaged, as the shift rod cuts off communication between conduits 27 and 28 and places the conduit 27 in communication with the atmosphere through either the recess 30 or recess 31.

From the foregoing description of my invention, it is clearly seen that I have provided power actuated means for holding the brakes applied, which power means is operable in conjunction with power means for disengaging the clutch but is prevented from operating when the transmission is in its highest and next to highest speed ratios.

Having fully described my invention, what I claim as new and desire to secure by Letters Patent of the United States is:

1. In a motor vehicle provided with a clutch, power operated means for disengaging the clutch, and a braking system having brakes, holding means for preventing release of the brakes from applied position, a second power operated means for actuating the holding means, the power operated means for said holding means being operated when said clutch is actuated by its power means.

2. In a motor vehicle provided with a clutch, power means for disengaging the clutch, a change speed transmission and a braking system having brakes, power-operated holding means for preventing release of the brakes from applied position, said holding means being operated when said clutch is actuated by its power means, and means governed by the position of an element of the transmission for rendering said holding means inoperative.

3. In a motor vehicle provided with a clutch, a change speed transmission and a braking system having brakes, holding means for preventing release of the brakes from applied position, power means for actuating the clutch and operating the holding means, and means governed by the position of an element of the transmission for rendering said holding means inoperative when the clutch is actuated.

4. The combination with the clutch mechanism, brake mechanism provided with brakes, and change speed transmission mechanism of a motor vehicle, of power-operated means for disengaging the clutch, power-operated means for holding the brakes applied, both of said power-operated means receiving their power from the same source, and means operable when the transmission is in either its highest or next to highest speed ratio positions for rendering said holding means inoperative when the clutch is disengaged.

5. The combination with the clutch mechanism, brake mechanism provided with brakes, and change speed transmission mechanism of a motor vehicle, of power operable means for disengaging the clutch and for holding the brakes applied while the clutch is disengaged and the elements of the transmission are in a selected relation, said holding means being inoperative under disengaged position of the clutch when the transmission elements are in another selected relation.

6. The combination with the clutch mechanism, brake mechanism provided with brakes, and a shifting rod of a change speed transmission, of power operable means for disengaging the clutch and for holding the brakes applied, and valve means operable by said shifting rod when in a selected position for preventing the holding means from being operable when the clutch is disengaged.

7. The combination with the clutch mechanism, brake mechanism provided with brakes, and a shifting rod of a change speed transmission, of power means for disengaging the clutch, holding means for preventing release of the brakes from applied position, power means for operating said holding means and receiving its power from the same source as the clutch operating power means, and valve means operable by said shifting rod when in a selected position for preventing the power means of the holding means from being operated when the clutch is disengaged.

8. The combination with the engine manifold, the clutch mechanism, the hydraulically-actuated brake mechanism provided with brakes, and a shifting rod of the change speed transmission mechanism of a motor vehicle, of a suction motor for disengaging the clutch, valve means for preventing release of the brakes from applied position, a suction motor for operating said valve means, said suction motor being connected to said manifold, and valve means operable by said shifting rod when in a selected gear ratio position for preventing the valve operating suction motor from operating when the clutch is disengaged.

9. The combination of a braking mechanism provided with brakes for checking the momentum of a motor vehicle in both forward and reverse direction and a change speed transmission mechanism of a motor vehicle, power-operated holding means for preventing release of the brakes from applied position when the elements of the transmission are in a selected speed ratio position, said power-operated holding means being inoperative when the elements of the transmission are in another selected speed ratio position.

10. The combination of a braking mechanism provided with brakes and a shifting rod for selecting the highest and next to the highest speed ratios of a change speed transmission, holding means for preventing release of the brakes from applied position, of power means for operating said holding means, and means operable by said shifting rod in its highest and next to highest speed ratio positions for preventing said power means from operating.

11. The combination of an hydraulically-actuated braking system having brakes and a shifting rod for selecting the highest and next to the highest speed ratios of a change speed transmission, of a valve in said braking system for preventing release of the brakes from applied position, suction-operated power means for operating the valve, and valve means operable by said shifting rod in its highest and next to highest speed ratio positions for preventing said suction-operated power means from operating.

12. In a motor vehicle provided with a clutch mechanism, a change speed transmission, and a braking system having brakes, power-operated holding means for preventing release of the brakes from applied position, said holding means being operated when the clutch mechanism is actuated, and means governed by the position of an element of the transmission for rendering said holding means inoperative.

13. In a motor vehicle provided with a change speed transmission and a braking system having brakes, holding means for preventing release of the brakes from applied position, power means for operating said holding means, and means for controlling said power means by an element of the transmission.

14. In a motor vehicle provided with a transmission, an accelerator mechanism and a braking system having brakes, power-operated holding means for preventing release of the brakes from applied position, means operative by the accelerator mechanism when it assumes an "off" position for operating said holding means, and means operative by an element of the transmission for rendering said holding means inoperative.

15. In a motor vehicle provided with a clutch mechanism and a braking system having brakes, holding means for preventing release of the brakes from applied position, power operated means connected to directly operate said holding means, and means for operating said power operated means simultaneously with the actuation of the clutch mechanism.

16. In a motor vehicle provided with a clutch, power operated means for disengaging the clutch and a braking system having brakes, means for preventing release of the brakes from applied position, power operated means for operating said release preventing means, and means for simultaneously operating both of said power operated means.

17. In a motor vehicle provided with an accelerator mechanism, a clutch and power operated means for disengaging the clutch, a braking system having brakes, means for preventing release of the brakes from applied position, power operated means for operating said release preventing means, and means controlled by the accelerator mechanism for simultaneously operating both of said power operated means.

18. In a motor vehicle provided with a clutch, a fluid motor for operating said clutch a braking system having brakes, means for preventing the release of the brakes from applied position, a fluid motor for operating said release preventing means, and means for operating said fluid motors simultaneously.

19. In a motor vehicle provided with an accelerator mechanism, a clutch a fluid motor for operating said clutch, a braking system having brakes, means for preventing the release of the brakes from applied position, a fluid motor for operating said release preventing means, and means controlled by the accelerator mechanism for operating said fluid motors simultaneously.

20. In a motor vehicle provided with a clutch and a braking system having brakes, means for preventing release of the brakes from applied position, power means for disengaging the clutch and for operating the brake release preventing means and comprising a pair of fluid motors, manually operable means for controlling said power means, and additional manually operable means for disabling said brake release preventing means.

21. In a motor vehicle provided with an accelerator mechanism, a clutch and a braking system having brakes, means for preventing release of the brakes from applied position, power means for disengaging the clutch and for operating the brake release preventing means, means for controlling said power means by the accelerator mechanism, and manually operable means for disabling said brake release preventing means.

22. In a motor vehicle provided with brakes and with clutch mechanism, fluid pressure-operated means for applying and releasing the brakes, a fluid system including a fluid motor for operating the clutch mechanism, and means associated with the fluid pressure brake applying and releasing means for holding the brakes applied, said means including a movable member in communication with the clutch operating fluid system and controlled by fluid in said system to cause the holding means to be effective when the system is operated to place the clutch mechanism in disengaged condition.

23. In a motor vehicle provided with brakes and with clutch mechanism, fluid pressure-operated means for applying and releasing the brakes, a fluid system including a fluid motor for operating the clutch mechanism, and means associated with the fluid pressure brake applying and releasing means for preventing release of the brakes from applied position, said means comprising a valve and means in communication with the clutch operating system and operable by fluid therein to cause the release preventing means to be effective when said fluid system is operated to place the clutch mechanism in disengaged condition.

WALTER R. FREEMAN.